USO05316324A

United States Patent [19]
Hufe, Jr.

[11] Patent Number: 5,316,324
[45] Date of Patent: May 31, 1994

[54] COLLET-AND-SHANK ASSEMBLY

[76] Inventor: Warren E. Hufe, Jr., Wells Ave., Southold, N.Y. 11971

[21] Appl. No.: 997,027

[22] Filed: Dec. 28, 1992

[51] Int. Cl.$^5$ .............................................. B23B 31/20
[52] U.S. Cl. ........................................ 279/51; 279/53
[58] Field of Search .................................... 279/51-53, 279/39, 58, 59; 408/240; 409/232, 234

[56] References Cited

U.S. PATENT DOCUMENTS

| | | |
|---|---|---|
| 2,478,195 | 8/1949 | Hull . |
| 2,783,051 | 2/1957 | Stromme ................................ 279/50 |
| 3,120,961 | 2/1964 | Clarkson ........................... 279/53 X |
| 4,023,815 | 5/1977 | Dunham ........................... 279/51 X |
| 4,867,463 | 9/1989 | Hopf ..................................... 279/50 |

FOREIGN PATENT DOCUMENTS 854136 10/1952 Fed. Rep. of Germany ........ 279/53

Primary Examiner—Steven C. Bishop
Attorney, Agent, or Firm—Thomas L. Bohan; Chris A. Caseiro

[57] ABSTRACT

A collet-and-shank assembly for gripping a work piece or tool used in rotary cutting equipment. The assembly includes a dual-threaded nut that enables the machine operator to lock and release the device from a single end. The dual-threaded nut is completely recessed within the shank, thereby reducing the overall length of the assembly and increasing the available working space. In the preferred embodiment of the collet-and-shank assembly, the dual-threaded nut has an interior right-hand threading corresponding to the outside threading of a section of the collet. The exterior of the dual-threaded nut has a threading orientation opposite to that of the interior region, corresponding to the threading of an interior section of the shank. When the exterior of the dual-threaded nut is threaded into the shank and the collet is threaded into the interior of the dual-threaded nut, the collet is affixed to the shank, and the work piece or tool is also locked within the collet. Utilization of fixed inside shank and outside collet dimensions where the dual-threaded nut joins the two eliminates the need to provide a supplemental adapter when, for example, a small tool or work piece must be used in a large turret or spindle hole.

10 Claims, 3 Drawing Sheets

COLLET-AND-SHANK ASSEMBLY

BACKGROUND OF THE INVENTION

1. Field of the Invention

The present invention relates to a collet-and-shank assembly device for gripping and securing work tools and work pieces used in various types of machining operations. More particularly, the present invention relates to a collet-and-shank assembly device that can be tightened or loosened from one end, and that provides for an increase in the space available to work on the piece to be machined. A unique locking nut of the present invention provides the means for single-end manipulation of the entire assembly device.

2. Description of the Prior Art

In the field of lathes, screw machines, and other similar rotary machining equipment, various tool- or work piece-holding devices have been designed to grip the tool or piece securely. The collet is a common element of such gripping devices. Collets are generally compressible tubes or sleeves that engage the work piece or tool in such a way that it either does not move, or only moves in the same way that the collet does. In most instances, the collet acts in conjunction with a closing element that surrounds the collet and provides uniform pressure to the entire outer perimeter of the collet. This closing element is typically a sleeve-like body that may be similar in appearance to the collet. The collet is designed such that when this uniform pressure is applied to it, its radial dimensions are reduced, and the tool or work piece located within the collet is locked in place. The means by which the closing element—generally a sleeve or shank with an inner diameter that is larger than the collet's outer diameter—applies pressure to the collet can vary. Prior to the application of such pressure it is necessary to first form the collet so that it can be uniformly compressed when pressure is applied to it. Of course, in order to remain effective through more than one use, the collet must be designed so that it can "spring" back to its original shape when that pressure is removed. This is achieved in prior gripping devices by providing the collet with a split end, i.e., making it a split-type collet. A split-type collet has an end region formed of several sections, each separated by slots or openings that, in effect, reduce the overall hoop strength of that end of the collet. Furthermore, the collet is tapered at the end region, with the several sections having the collet's greater outer diameter. The closing element that is used to apply uniform pressure to the collet is also tapered; however, its smaller outer dimension is that region that corresponds to and comes in contact with the collet's end region. Using means to draw the collet into the tapered closing element, the larger collet end region with its several sections and spacings is squeezed into the closing element's end region such that the several collet sections close in nearer each other, thereby reducing the outer and inner diameters of the collet. By placing the work piece or tool within the collet and then drawing the collet into the closing element, that tool becomes locked in position as a result of the reduction in size of the inner diameter of the end region of the tapered collet. Once the tool or work piece is locked in position, the collet and accompanying closing element are placed in the machining equipment.

One problem with the prior tool-securing devices that include collets is that they are designed such that the various components must be joined together from both ends of the assembly. That is, at one end of the collet—generally the end that is not tapered—a first securing component joins the collet to the closing element. At the opposite end—the tapered end of the collet—a second securing component on the outside of the closing element acts to compress the collet at that tapered end such that it grips the work piece or tool located in the bore of the collet. This second securing component may be a threaded ring joined to the closing element, it may be a nut affixed to the exterior of the closing element, or it may be a compressing sleeve of the type described in U.S. Pat. No. 2,783,051, issued to Stromme in 1957.

Regardless of the type of securing component or components used, the prior devices require manipulation at both ends of the assembly in order to secure the tool for machining operations. This dual-ended manipulation reduces the amount of room available to work on an item. In earlier machining equipment, one operated on the work piece from only one end of the equipment's turret or spindle. Present equipment, and CNC lathes in particular, permit the operator to work the piece from both sides of the turret. The ability to work on a piece from both sides of the equipment has greatly improved production capability. However, it has also reduced the space available to work on that piece. This is because the bed length of the machining equipment has remained essentially the same while the turret or spindle operates over a wider area than in the past. The present tool/piece securing means have failed to keep up with the improved capability of dual-end machining because they are limited to the extent that they permit an operator to place the tool or work piece all the way into the turret or spindle holder. In addition, the use of two securing components increases the overall length of the prior gripping devices. This length increase reduces the working space available on the equipment.

Another problem with prior securing devices involves the shank—the closing element used to retain the collet. It is well known that machining equipment of the type noted is made with various turret hole sizes. Since it is much less expensive to have a variety of collet and shank assemblies rather than a variety of machines, it has been necessary to adapt such assemblies to the turret/spindle holes. Present shanks come in a range of sizes designed to fit into the range of turret holes. For a shank of a particular size, only collets in a certain range of sizes can be used with that particular shank. A problem arises when the machine operator has a machine with a turret hole that requires a shank of a certain size, and a tool that requires a collet falling outside of the range of collets available for that certain shank. Generally, this occurs when the turret hole is large and the tool is small. In that situation, an adapter must be inserted into the turret hole in order to accommodate a smaller shank that will be able to retain a smaller collet. Unfortunately, the need to have this supplemental adapter increases the accumulation of error in matching the work tool to the work piece.

A further problem with the various shanks of the prior assemblies is the fact that different shanks have different securing components—larger shanks having larger securing components. Of course, with the larger shanks and securing components—particularly the generally-available securing components that are located on the exterior of the shank—comes a reduction in available working space.

Still another problem associated with present chucking devices is the expense involved. Collet assemblies currently available are most commonly made of hardened steel. Give the fact that tools and work pieces gripped in the collet vary greatly in size, it is necessary to stock a number of collets, even to the point that it is sometimes necessary to purchase a collet or collets for one-time use only. The cost to secure the tool or work piece is therefore considerable. In addition to the upfront expense of the present collets, the fact that they are made of hardened steel eliminates the possibility of easily modifying them to accommodate other work pieces or tools, by, for example, enlarging the bore hole into which the piece or tool is placed.

Therefore, what is needed is an assembly for securing tools and work pieces that can be locked and released from one end only, in order to provide the maximum possible space in which to work on the secured piece. What is also needed is an assembly for securing tools and work pieces that eliminates the need for a supplemental adapter used to accommodate the range of turret holes, spindle holes, work tools, and work pieces. Further, what is needed is a chucking device that can be made inexpensively and of materials machinable enough to be easily modified while still hard enough to provide sufficient strength to grip the tool or work piece therein under anticipated operating conditions.

SUMMARY OF THE INVENTION

It is an object of the present invention to provide an assembly that will secure tools and work pieces located therein and that can be made to do so by locking and releasing the entire unit from one end of the device. It is another object of the present invention to provide a chucking device that maximizes the space available to work on a piece located therein, particularly when the piece to be worked is in the type of machining equipment that enables the operator to work both sides of the equipment's turret. It is still another object of the present invention to provide an assembly that will secure tools and work pieces therein for the entire applicable range of turret holes, without the need for a supplemental adapter. It is yet another object of the present invention to fabricate a chucking device inexpensively and suitable for easy modification but with all the characteristics necessary to grip the work piece or tool and to properly secure it throughout standard machine operating conditions.

The collet-and-shank assembly of the present invention achieves the above-noted objectives through several assembly modifications. The present assembly includes a collet and a closing element—the shank—that are essentially the same major components used in prior gripping devices. However, they are formed to accommodate a novel dual-threaded nut that is the single securing component of the assembly. This dual-threaded nut enables the user to lock and release the work tool or piece from a single end by acting to affix the collet to the shank and also locking the work tool or work piece in the collet. As previously indicated, the prior gripping devices have separate securing components, one at one end to affix the collet to the closing element, and one at the opposite end to "crack" the taper of the collet in order to lock the tool or work piece in position.

The dual-threaded nut of the present invention performs both operations because the orientation of the two threading formats differs. The dual-threaded nut has a first threading orientation and that corresponds to the orientation of threading at one end of the closing element, and a second threading orientation that is opposite the first threading orientation and that corresponds to the threading orientation of the collet at the end of the collet corresponding to the threaded end of the closing element. By way of example, one would start with left-hand threading at the inside diameter of one end of the closing element. The dual-threaded nut would also have left-hand threading, but on its outside diameter. In addition, the nut would have right-hand threading on its inside diameter, corresponding to righhand threading on the outside diameter of the collet. In that situation the collet is drawn into the closing element when the dual-threaded nut is torqued, and the tool or work piece located within the collet becomes locked in place. Of course, the threading pitch for both threading orientations must be the same. It is to be understood that the above description is only one example and that other orientations and configurations are possible.

The present dual-threaded nut with oppositely-oriented threading on the inside and outside permits the user to secure the collet within the shank. It also locks the work piece or tool into the collet. With the same threading pitch on both the inside and outside, the dual-threaded nut acts much like a turnbuckle, with an effective collet moving rate that would be the same as that for a single-threaded securing component with a threading pitch half that of the dual-threaded nut. In this way, the operator can have the security corresponding to greater threading pitch while at the same time getting an effective torquing rate that is much faster than that available with a single-threading design.

The assembly of the present invention also includes modifications to the collet and the shank that enable the machine operator to take maximum advantage of the space available to work on the piece gripped by the assembly. Specifically, many prior art gripping devices have securing components which effectively cap the end of the assembly so that the tool or work piece can only be inserted in the assembly as far as the inside of the securing component. The present assembly is modified in such a way as to permit a tool or work piece to be run completely through either end of the collet. The collet and the shank both have open throughbores. Additionally, the novel dual-threaded nut has an open throughbore so that the tool or work piece can be inserted through it. Most other devices have a closing element with a shoulder that limits the extent to which the device can be inserted in the machine holder. The shank of the present assembly has been modified to eliminate the shoulder and instead has a removable retainer that can either be used to fix the assembly in a particular position within the equipment's holder, or that can be removed so that the assembly may be placed farther into the holder. Furthermore, the dual-threaded nut of the present invention increases the working space available because it eliminates the need for one of the securing components located at an end of the gripping device, resulting in a shorter assembly than prior collet assemblies while still performing the same functions. In the preferred embodiment of the present invention, the dual-threaded nut can be fitted to the collet and shank such that, when the tool or work piece is locked, the end of the nut is flush with the end of the collet and shank—a design that further increases the available working space.

A further modification of the collet-and-shank assembly of the present invention relates to the adaptability of that assembly to various machine turret or spindle hole sizes. As indicated, adaptation of present collets to various turret holes can lead to an accumulation of error in production. In order to minimize or eliminate this problem, the present assembly has a single set of collets that can be fitted to any size shank. In conjunction, a single set of shanks has been developed to be fitted to any size turret or spindle hole. In this way, no adapter is needed to fit a small collet into a large turret hole, for example. This accommodation is achieved in the present invention by varying the outside dimension of the shank—in order to fit all turret hole sizes—and maintaining fixed inside shank dimensions where the collet and shank are joined. The collets, in turn, have fixed outside dimensions where the collet and shank are joined—in order to fit into the shank—and varying inside collet dimensions—in order to accommodate tools and work pieces of various sizes.

A further benefit of the fixed inside shank dimensions and fixed outside collet dimensions relates to the dual-threaded nut. With such fixed dimensions, a single dual-threaded nut size can be used for all collets and all shanks, unlike the prior gripping devices, which require externally-positioned securing components of varying sizes to lock assemblies of various sizes. For the larger prior devices, the larger securing components further reduce the amount of working space available on the machining equipment. On the other hand, the present collet-and-shank assembly increases the working space available and still eliminates the need for an assembly adapter. This advance is achieved using the dual-threaded nut to join the collet and shank, and by maintaining fixed compatible dimensions for the inside of the shank and outside of the collet where the two are joined.

As previously noted, the gripping devices presently available are fabricated of hardened steel. This material provides the strength necessary to maintain a tool or work piece in position under typical operating conditions. However, it is expensive and very difficult to machine should an equipment operator wish to reconfigure the throughbore of the collet. As an alternative, the present collet-and-shank assembly can be fabricated of a "softer" material that reduces the difficulty in machining, should the device have to be modified. One material in particular that is well-known as an easy-to-machine material, relative to hardened steel, is Aluminum. For certain applications, it is also possible to use other "soft" metals, and even high-strength plastics. It is to be noted that the collet and shank formed of alternative materials must simply be formed with dimensions sufficient to provide the strength required to lock a tool or work piece in position under standard production conditions.

It is to be noted that when the collet of the present invention is formed of a "soft" material, the throughbore can easily be modified. When the collet is a split-type, the sections at the collet's face end are fixed in position by pinning those sections open after the collet is inserted into the shank. The assembly is then placed in the drilling equipment and locked in place. The pinned sections retain their original configuration as the throughbore is then drilled larger using standard machining methods. With this design it is possible to obtain more gripping devices for the wide variety of work pieces and tools available.

The collet-and-shank assembly of the present invention provides a tool- or work piece-gripping device that can be locked and released from one end, unlike prior gripping devices which require manipulation at both ends. A key feature of the present invention is the dual-threaded nut that provides the means for single-ended manipulation. Additionally, the present collet-and-shank assembly enables a machine operator to maximize the space available to work on an item, particularly with present machining equipment by making the entire assembly so that it can be fully inserted into the machine holder. Further, the present collet-and-shank assembly is designed with fixed inside shank dimensions and fixed outside collet dimensions where the two are joined that eliminate the need to supplement the securing assembly with an adapter, particularly when small tools or work pieces are to be used in large turret or spindle holes. Still further, the present invention may be fabricated of materials that are much less expensive than the materials used in prior gripping devices. One such material, Aluminum, can be machined much more easily than hardened steel, so that the user can more easily modify the bore of a particular collet in order to accommodate a particular tool or work piece.

DETAILED DESCRIPTION OF THE PREFERRED EMBODIMENT

Figure 1:
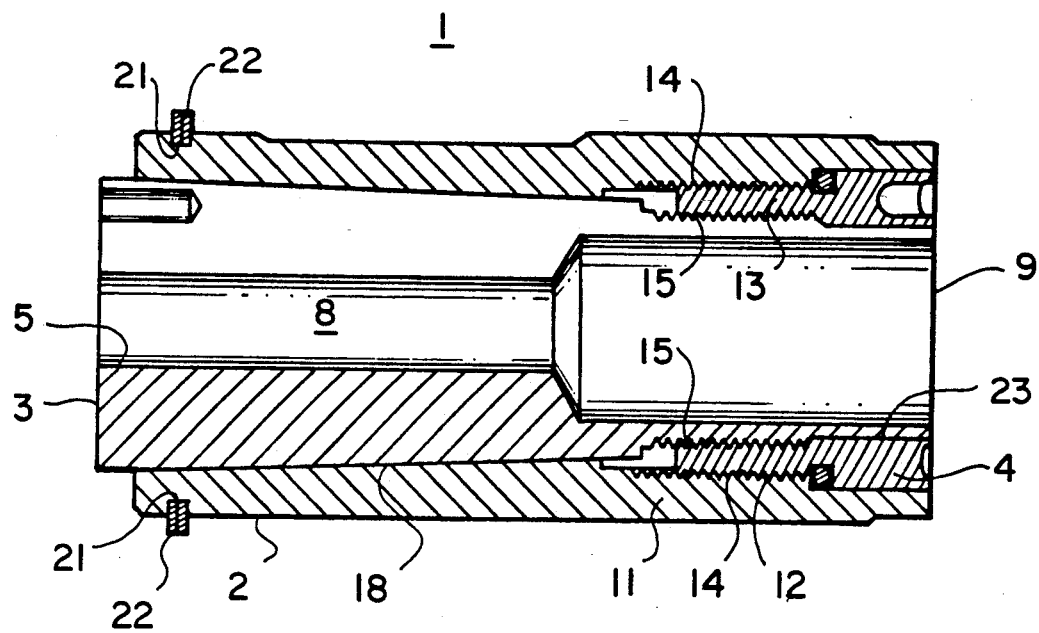
FIG. 1 is a cross-sectional view of the complete collet-and-shank assembly of the present invention.
Figure 2:
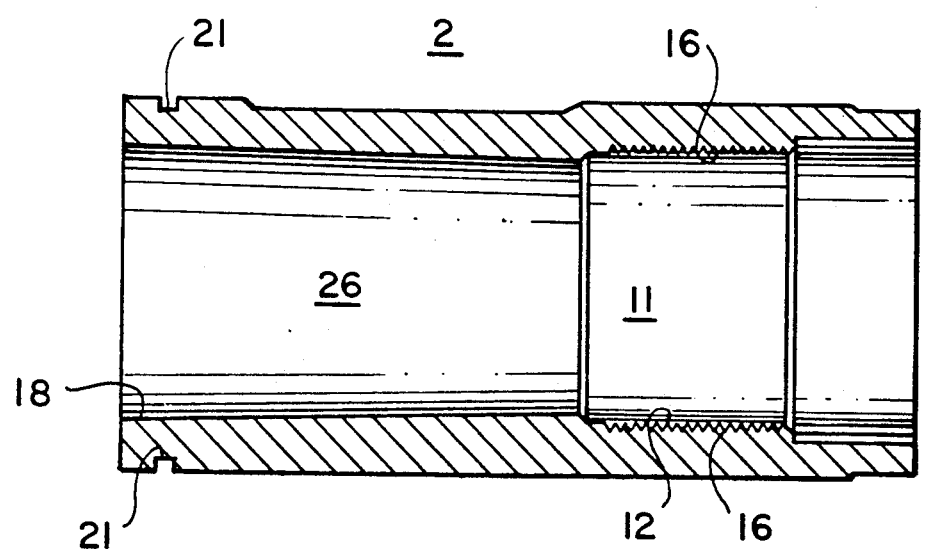
FIG. 2 is a cross-sectional view of the shank of the present invention.
Figure 3:
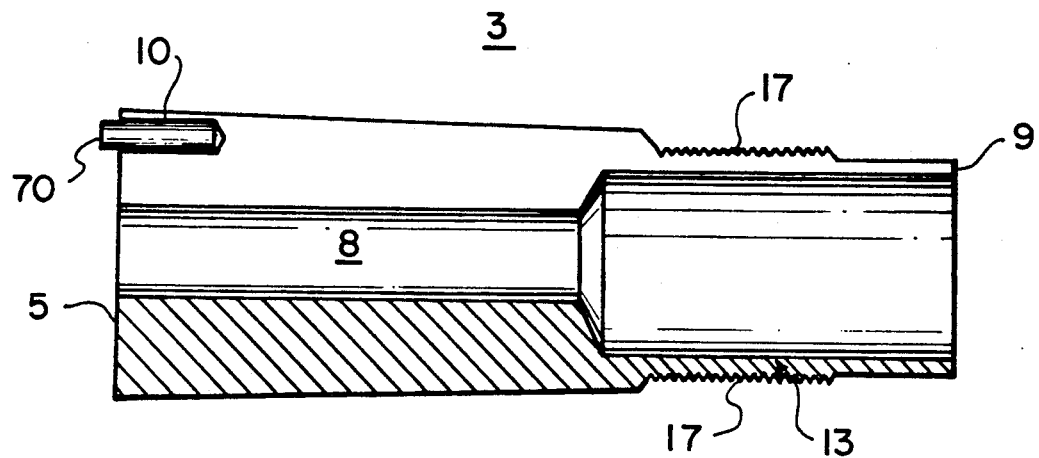
FIG. 3 is a cross-sectional view of the collet of the present invention.
Figure 4:
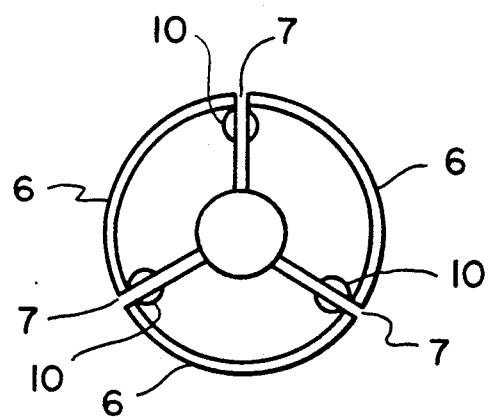
FIG. 4 is an end view of the tapered end of the collet of the present invention, showing the collet sections and openings.

A collet-and-shank assembly 1 of the present invention includes a shank 2, a collet 3, and a dual-threaded nut 4, as illustrated in FIG. 1. In use, the collet-and-shank assembly 1 is placed in a spindle or turret holder of a lathe or similar rotary machining equipment (not shown) for gripping a tool or work piece. The collet 3 is that portion of the collet-and-shank assembly 1 that comes in contact with, and actually secures, the work piece or tool. As with most prior collets, the collet 3 of the present invention is tapered, as is a first interior shank region 18 of the shank 2, as illustrated in FIG. 2. In the preferred embodiment of the invention, the collet 3 is a split-type collet; that is, a first collet zone 5 of the collet 3 is formed of three split collet sections 6, as illustrated in FIGS. 3 and 4. It is to be noted that more or less than three split collet sections 6 may form part of the collet 3.

Collet split openings 7 between each of the three split collet sections 6 provide the means by which those collet sections 6 may be compressed in upon each other, in turn tightening the grip on the work piece or tool placed within a tool opening 8 that begins in the first collet zone 5 and extends into a second collet zone 9. The tool opening 8 illustrated in the FIGS. is about ¼" in diameter at the first collet zone 5, a typical bore size for gripping devices of this type, and in the preferred embodiment of the present invention, the tool opening 8 is slightly less than ¼" in diameter at the second collet zone 9. It is the tool opening 8 size of the collet 3 that can be varied in the present invention, in order to accommodate tools or work pieces of varying sizes. The outer diameter of the illustrated collet 3 is preferably about ¾" in diameter at the end of the first collet zone 5, and preferably has a taper of about 3° over a portion of that first collet zone 5. The outside diameter of the collet 3 at the second collet zone 9 is fixed for the reasons previously noted.

The shank 2 illustrated to operate in combination with the collet 3 has a shank opening 26 with an inside diameter of about ¾" for insertion of the collet 3, initiated at the second collet zone 9. The shank opening 26 preferably has a taper of about 3° extending the entire length of the first interior shank region 18. The inside diameter of the shank 2 at a second interior shank region 12 of the assembly of the present invention is fixed, in order to accommodate the collet 3 with the fixed second collet zone 9 outside dimensions, regardless of the size of the tool opening 8. The outside diameter of the shank 2 can be varied in order to fit the shank 2 to various spindle hole or turret hole sizes, without the need to also include an adapter, as is otherwise required in prior collet and shank assemblies.

The collet 3 is fabricated of a material with sufficient elasticity that upon loosening, the three split collet sections 6 spring back into position, thereby releasing the tool from the collet 3. It has been found that Aluminum is an inexpensive, suitable metal to use; however, steel and other sufficiently-strong materials may also be used-even high-strength plastics. Aluminum is found to be particularly advantageous when it is necessary to modify the inside diameter of the tool opening 8. For example, when a tool or work piece with an outside diameter greater then the tool opening 8 diameter is required, and no other collet is suitable for use with the particular tool or work piece, the Aluminum can easily be machined, while hardened steel, the standard collet material, cannot. As noted, the collet 3 of the present collet-and-shank assembly 1 described herein is a split-type collet. Even it may be prepared for such modification. Specifically, as illustrated in FIGS. 3 and 4, the collet split openings 7 include split opening lock positions 10 located at the outer perimeter of the split collet sections 6, and preferably extending about one-fourth to one-third of the length of the first collet zone 5. When the tool opening 8 is to be enlarged, collet pins 70 may be inserted in the split opening lock positions 10 so as to prevent compression of the split collet sections 6 when the collet 3 is first gripped in the shank 2 and then inserted into a lathe, or similar rotary machining equipment, for modification as desired by the user.

Figure 5:
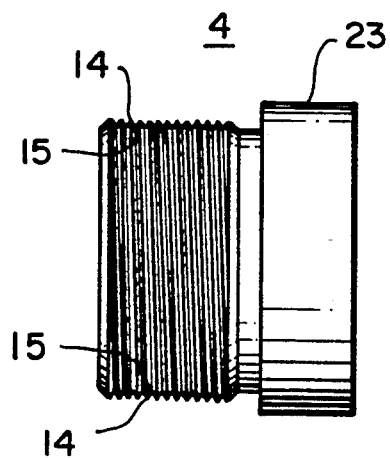
FIG. 5 is a side view of the dual-threaded nut of the present invention.
Figure 6:
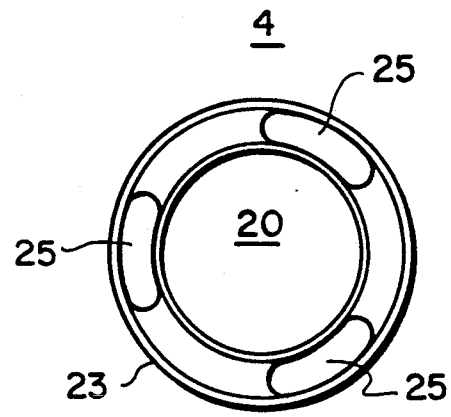
FIG. 6 is an end view of the dual-threaded nut of the present invention, showing the nut wrench holes.
Figure 7:
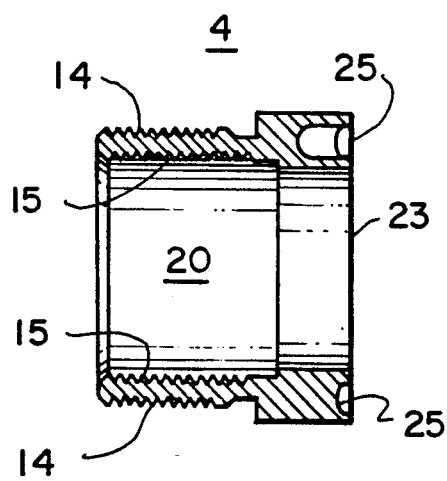
FIG. 7 is a cross-sectional view of the dual-threaded nut of the present invention, showing the opposing thread orientations on the inside and outside of the nut.

The tightening of the collet 3 on the work piece or tool is achieved by the combination of the shank 2 and the dual-threaded nut 4 acting on the collet 3 when it is located within the shank 2. As illustrated in FIG. 1, the second collet zone 9 is positioned within a second shank zone 11 of the shank 2 and the dual-threaded nut 4 joins the second interior shank region 12 of the second shank zone 11 to a second exterior collet region 13 of the second collet zone 9. At the heart of the invention is the operation of the dual-threaded nut 4 illustrated in FIGS. 5–7. In order to permit a user to lock and release the collet-and-shank assembly 1 from one end, the dual-threaded nut 4 is left-hand threaded at an exterior lower nut region 14 and it is right-hand threaded at an interior lower nut region 15. The left-hand threading of the exterior lower nut region 14 corresponds to left-hand shank threading 16 of the second interior shank region 12, and the right-hand threading of the interior lower nut region 15 corresponds to right-hand collet threading 17 of the second exterior collet region 13. In the preferred embodiment of the present invention, all of the threaded regions have 20 threads/inch; however, alternative threading pitches may be used without any decline in the effectiveness of the invention. In addition, the threading orientation may be reversed without any adverse effect, as long as the thread orientation of the exterior lower nut region 14 corresponds to the orientation of the second interior shank region 12 and the interior lower nut region 15 has the opposite orientation of the threads of the exterior lower nut region 14 and, in turn, corresponds to the threading of the second exterior collet region 13. Also, the threading pitch must be the same at all locations, as would be expected.

Figure 8:
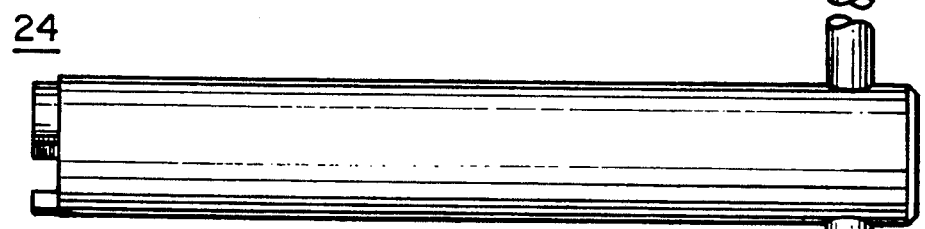
FIG. 8 is a top view of a spanner wrench used to operate the assembly of the present invention.
Figure 9:
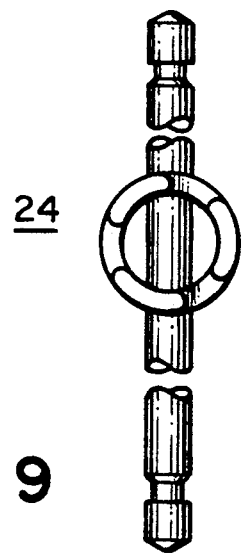
FIG. 9 is a side view of the spanner wrench used to operate the assembly of the present invention.

In operation, all collet-and-shank assembly 1 joining steps occur at one end of the assembly. The exterior lower nut region 14 of the dual-threaded nut 4 is first secured on the second interior shank region 12, so that the end of an upper nut region 23 is flush with the end of the second shank zone 11. Because the dual-threaded nut 4 is flush with the shank 2, available working space is maximized. After the dual-threaded nut 4 is secured to the shank 2, the collet 3, with the work piece or tool positioned in the tool opening 8, is inserted into the dual-threaded nut 4 such that the second exterior collet region 13 may be secured to the interior lower nut region 15. A spanner wrench 24 illustrated in FIGS. 8 and 9 is then inserted into nut wrench openings 25 and turned to the point that the taper of the collet 3 is cracked and the work piece or tool is locked in place. Release simply requires reversing the noted steps.

The dual-threaded nut 4 provides more operating room on machining equipment because it reduces the overall length of the collet-and-shank assembly 1 in comparison to the length of prior similar devices. Furthermore, the fact that the inside diameter of the shank 2 at the second interior shank region 12 is fixed, and the outside diameter of the collet 3 at the second collet zone 9 is fixed, permits the machine operator to utilize a single size dual-threaded nut 4 for a variety of collet and shank sizes. For larger collet-and-shank assemblies 1 this eliminates large exterior securing components, thereby increasing the available working space. As previously noted, use of fixed dimensions in these regions eliminates the need for a hole adapter.

In addition to the working space availability increase provided by the dual-threaded nut 4, the shank 2 and the collet 3 are also designed to maximize that space availability. As illustrated in FIGS. 1 and 3, the tool opening 8 extends completely through the collet 3. Furthermore, the dual-threaded nut 4 and the shank 2 are also fabricated such that a tool or work piece may be placed entirely through the collet-and-shank assembly 1, with the shank opening 26 and a nut opening 20 providing the pathway for complete insertion of the tool or work piece. With this design the tool or work piece may be positioned as desired in the collet-and-shank assembly 1, with the equipment's chuck holder (not shown) being the limiting factor, rather than the design of the gripping device. The shank 2 is also specifically designed to permit the user to place the collet-and-shank assembly 1 as far into the equipment's chuck holder as possible. Most prior gripping devices include a shank shoulder or an exterior securing component that limits the extent to which the gripping device may be inserted into a machine holder. As illustrated in FIGS. 1 and 2, the shank 2 of the present invention includes a retaining ring inset 21 for insertion of a retaining ring 22. When the retaining ring 22 is positioned within the retaining ring inset 21, the collet-and-shank assembly 1 can be inserted into the equipment's holder only to the point where there is a shoulder within that holder. When the retaining ring 22 is removed, the entire collet-and-shank assembly 1 may be fully inserted into the equipment's holder, thereby increasing the working space available on the machining equipment's bed. The combination of the alternative use of the retaining ring 22, rather than a fixed shoulder on the shank 2, and the use of the single dual-threaded nut 4 that is flush with the end of the second interior shank region 12 provides a collet-and-shank assembly 1 that secures a work piece or tool while at the same time maximizing the working space available.

While the collet-and-shank assembly of the present invention has been described and illustrated with particular reference to specific components and configurations, it is to be understood that alterations in particular materials of construction, collet and shank types, and assembly dimensions and configurations may be made without deviating from the basic attributes of the invention.

I claim:

1. A collet-and-shank assembly for gripping a work piece or a tool therein, said collet-and-shank assembly comprising:
   a. a collet with a tool opening for receiving said work piece or said tool;
   b. a shank with a collet opening for receiving said collet, wherein said shank is insertable in a machine's holder, said shank having a removable retaining ring on an exterior shank region, wherein said removable retaining ring is designed to engage a stop shoulder within said machine's holder; and
   c. a securing component with collet connection means for removably joining said collet with said securing component, and shank connection means for removably joining said shank with said securing component,
   wherein said securing component is designed to affix said collet to said shank and to lock said tool or work piece in said collet.

2. A collet-and-shank assembly for gripping a work piece or a tool therein, said collet-and-shank assembly comprising:
   a. a collet with a tool opening for receiving said work piece or said tool, said collet having a first collet region including a threaded portion having a first threading orientation and a first threading pitch;
   b. a shank with a collet opening for receiving said collet, wherein said shank is insertable in a machine's holder, said shank having a first shank region including a threaded portion having a second threading orientation and said first threading pitch; and,
   c. a dual-threaded nut having an interior section including a threaded portion for removably joining said collet with said dual-threaded nut, said threaded portion of said interior section of said dual-threaded nut having said first threading orientation and said first threading pitch, and said dual-threaded nut having an exterior section including a threaded portion for removably joining said shank with said dual-threaded nut, said threaded portion of said exterior section having said second threading orientation and said first threading pitch;
   wherein said dual-threaded nut is designed to affix said collet to said shank and to lock said tool or work piece in said collet.

3. The collet-and-shank assembly as claimed in claim 2 wherein said first threading orientation is a right-handed threading orientation and said second threading orientation is a left-handed threading orientation.

4. The collet-and-shank assembly as claimed in claim 3 wherein said first threading pitch is 20 threads/inch.

5. The collet-and-shank assembly as claimed in claim 2 wherein said collet is fabricated of Aluminum.

6. The collet-and-shank assembly as claimed in claim 5 wherein said shank is fabricated of Aluminum.

7. The collet-and-shank assembly as claimed in claim 2 wherein said collet is a split-type collet.

8. The collet-and-shank assembly as claimed in claim 7 wherein said split-type collet includes a plurality of split collet sections at a second collet region, with an equivalent number of collet split openings located between said split collet sections, wherein said split collet sections include split locking means for preventing the closure of said collet split openings upon the application of uniform pressure to the outside of said plurality of split collet sections.

9. The collet-and-shank assembly as claimed in claim 8 wherein said collet split openings comprise split opening lock positions and said split locking means comprises a plurality of pins placed within said split opening lock positions.

10. A collet-and-shank assembly for gripping a work piece or a tool therein, said collet-and-shank assembly comprising:
    a. a collet with a tool opening for receiving said work piece or said tool, said collet including a right-hand threaded region at a first collet region of said collet, wherein said collet is tapered and is a split-type collet comprising a plurality of split sections with collet split openings therebetween and removable split opening lock means for keeping said collet split openings open upon application of external pressure to said plurality split sections;
    b. a shank with a collet opening for receiving said collet, said shank including a left-hand threaded region at a first shank region of said shank, wherein said shank is tapered and is insertable in a machine's holder, said shank comprising a removable retaining ring on a second exterior shank region, wherein said removable retaining ring is designed to engage a stop shoulder within said machine's holder; and
    c. a dual-threaded nut with a right-hand threaded region at an interior nut region for removably joining said first collet region with said interior nut region, and a left-hand threaded region at an exterior nut region for removably joining said first shank region with said exterior nut region.

* * * * *